March 2, 1965  H. A. STORCH  3,171,459
LOCK NUT INDENTED AT THE CORNERS
Filed Jan. 23, 1962

INVENTOR.
Harold A. Storch
BY
Harness, Dickey & Pierce
ATTORNEYS.

# United States Patent Office 3,171,459
Patented Mar. 2, 1965

3,171,459
LOCK NUT INDENTED AT THE CORNERS
Harold A. Storch, Birmingham, Mich., assignor to Federal Screw Works, Detroit, Mich., a corporation of Michigan
Filed Jan. 23, 1962, Ser. No. 168,069
6 Claims. (Cl. 151—21)

This invention relates to lock nuts.

It is an object of the present invention to provide a lock nut having locally distorted thread areas adapted to frictionally engage the male threaded member on which the nut is threaded to provide a binding force preventing undesired loosening of the lock nut through vibration, shock and the like.

It is another object of the present invention to provide a lock nut of the above character in which the locally distorted areas are arranged to provide a high degree of gripping force on the male threaded member for a given size nut and for the magnitude of distortion imparted thereto and will maintain a high degree of gripping force on the male threaded member throughout repeated applications of the nut.

It is still another object of the present invention to provide a lock nut of the above character and a method for manufacturing the same in which the areas of distortion may be accurately and reliably restricted to a desired location at only one end of the lock nut, even on a nut body of short axial length, to leave a number of undistorted starting threads at the other end of the nut and thereby facilitate the application of the nut.

It is still another object of the present invention to provide a lock nut of the above character and a method for manufacturing the same in which the distortion imparted to the nut body by a die or the like will permanently reshape the metal in the localized areas desired without an undue tendency of the displaced metal to spring back toward its original shape.

It is a further object of the present invention to provide a lock nut of the above character having a maximum amount of wrench receiving side walls for the overall height and size of the lock nut.

It is still another object of the present invention to provide a lock nut which is inexpensive of manufacture, reliable in operation, convenient to use and sturdy in construction.

These and other objects of the present invention will become apparent from the following detailed description taken in conjunction with the accompanying drawings wherein.

Figure 1:
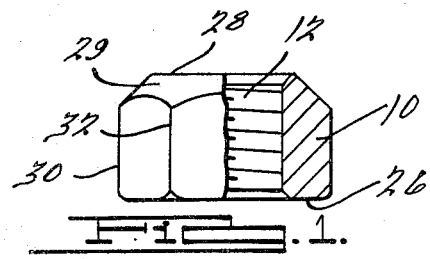
FIGURE 1 is an elevational view, partly in section, of a standard hexagonally shaped nut commonly known as a "hex nut"
Figure 2:
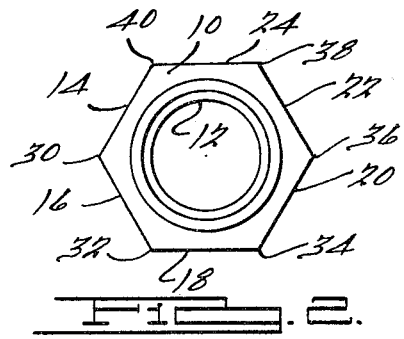
FIG. 2 is a plan view of the structure illustrated in FIG. 1.
Figure 3:
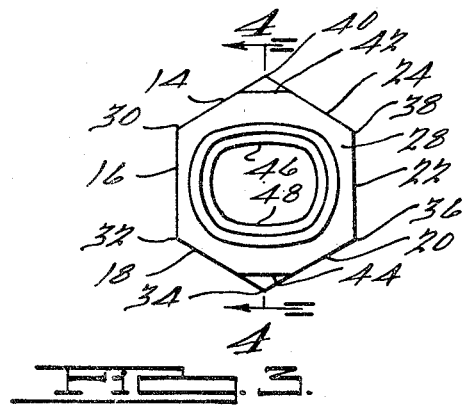
FIG. 3 is a plan view of the hex nut of FIGS. 1 and 2 which has been deformed to provide a hex nut made by and embodying the principles of the present invention.

Referring now to the drawings, the lock nut of the present invention is made from a standard hexagonal nut illustrated in FIGS. 1 and 2, which is made according to "American Standard" specifications. The nut of FIGS. 1 and 2 is then subjected to a further fabricating operation to form localized areas of distortion arranged in a new and novel manner. The nut will be seen to include a body 10 having a central threaded bore 12 of circular cross section and a plurality of uniformly shaped contiguous outer side walls 14, 16, 18, 20, 22 and 24. The body 10 is provided with an annular bottom wall 26, an annular top wall 28 and a chamfer or conical wall surface 29 interconnecting the top wall 28 and the side walls 14 through 24. It will be seen that the side walls are disposed in adjacent relationship and are contiguous along a plurality of axially extending edges or "corners" 30, 32, 34, 36, 38 and 40. Said edges are arranged symmetrically about the axis of the bore 12. The nut being of regular polygonal shape, the included angles between the sides are equal, and, in the case of a hexagon, the angle equals 120 degrees.

The nut of FIGS. 1 and 2 may be made from steel or any other deformable material by means of cold heading or any other desired manufacturing method, the fabrication of standard hex nuts being well known in the art. Said nut is then transformed into a lock nut in accordance with the present invention by a deforming operation in which the metal adjacent an opposite pair of edges is displaced radially inwardly. For this purpose, the nut is squeezed between two opposite flat die surfaces which engage an opposite pair of edges 34 and 40. Said die surfaces are moved toward one another in diametrically opposite directions with sufficient force to form a pair of flat opposite indentations or surfaces 42 and 44 at the upper portion of the edges 40 and 34.

As will be apparent from the drawings, the surfaces 42 and 44 are of a width substantially less than the width of the side walls 14, 16, 18, 20, 22 and 24. Further, the surfaces 42 and 44 are perpendicular to and centered with respect to a radial plane including the edges 34 and 40, from which they are struck. It will be seen that the formation of the surfaces 40 and 42 leaves shear surfaces 45 and 47 on the outer surface of the nut body 10. The surfaces 45 and 47 will be seen to be of triangular shape as viewed from the top of the nut (FIG. 6) and extend from their adjacent edge 34 or 40 to one end of the associated indentation surface 42 or 44. The formation of the indentations 42 and 44 leaves the subjacent portions of the edges 42 and 44 substantially undisturbed and parallel to the nut axis.

The formation of the indentations 42 and 44 radially inwardly displaces all of the metal of the nut wall in radial alignment with the peripheral surfaces struck by the die, creating inwardly distorted areas 46 and 48 of the threaded bore 12 and leaving an undeformed bore portion 50. When the nut is applied to a bolt or other male threaded member, the thread areas 46 and 48 bind against the threads of the bolt. The indentations are flexed outwardly slightly within the elastic limits of the metal and cause the thread areas 46 and 48 to grip the bolt with a force normally expressed in the torque required to rotate the nut on the bolt. The nut of the present invention has been found to "maintain its torque" through repeated applications to a bolt.

It has been found that the striking or squeezing of the nut at the edges, as illustrated herein, permits a greater permanent distortion of the wall of the nut without excessive "spring-back" or return of the metal toward its original shape as a result of the elastic character of the metal. In the formation of prior lock nuts in which the nut was squeezed at its sides, considerable elastic return of the nut was experienced. The magnitude of such return was not consistent and, as a result, substantial dimensional variation in the degree of thread distortion was encountered. Furthermore, when the nut was distorted enough to impart the desired permanent set thereto, the distortion was found to collapse the wall of the nut for a substantial axial distance. In many cases, this has resulted in distortion of the threads at the other end of the nut, which should be left undistorted to provide for convenient starting or initial application of the nut to the male threaded member.

Figure 5:
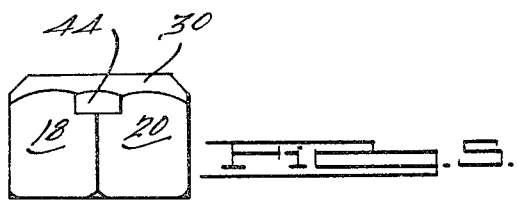
FIG. 5 is a side elevational view of the structure illustrated in FIG. 3.

The ability to more readily impart a permanent set to the metal in the formation of the nut of the present invention, as opposed to squeezing the nut on its sides, is believed to stem from the difference in the angular disposition of the intermediate side walls to the indenting force. In the present method, the metal does not as readily flex and can only distort under the inward movement of the indenting dies. When squeezing two opposite side walls toward one another, however, each adjacent pair of non-indented side walls will flex toward one another in a manner closing and re-opening the included angle therebetween. The localized distortion of the indented metal in the nut of the present invention will be seen to produce a definite peripheral surface outline of the area of the indentation, which is best shown in FIG. 5 with respect to the indentation 44. This outline of the indentation is readily observed by the mechanic, assembly worker, or other person using the nut, as an indication of the top of the nut. The opposite end of the nut, which has undistorted threads, is, of course, applied to the male threaded member first.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A lock nut comprising a nut body having two end surfaces; a central circular threaded bore extending from one end surface to the other end surface; an even number of contiguous outer flat side walls of equal width converging along axial edges extending parallel to the thread axis and spaced equally from the thread axis; a plurality of symmetrically spaced indentations, each of which is disposed in a location generally centered with respect to a radial plane including one of said edges, said indentations extending axially a distance less than one-half of the distance between said end surfaces and being spaced from one of said end surfaces, each of said indentations being defined on its radially inner side by a thread area which is displaced radially inwardly of the normal thread diameter and on its outer side by a localized indentation surface which extends between an adjacent pair of said side walls, which is of a width substantially less than the width of said side walls, and which is disposed radially inwardly of a line including an adjacent one of said edges; a plurality of shear surfaces, each extending between one end of one of said localized indentation surfaces and the edge adjacent thereto; said bore having at least one thread convolution of substantially circular shape adjacent the end surface from which said indentations are spaced; and the portions of the outer periphery of said nut between said indentations retaining a configuration body whereby said nut body can be engaged by a standard wrench.

2. A lock nut comprising a nut body having two end surfaces; a central circular threaded bore extending from one end surface to the other end surface; six contiguous outer flat side walls of equal width converging along six axial edges extending parallel to the thread axis and spaced equally from the thread axis; a plurality of symmetrically spaced indentations, each of which is disposed in a location generally centered with respect to a radial plane including one of said edges, said indentations extending axially a distance less than one-half of the distance between said end surfaces and being spaced from one of said end surfaces, each of said indentations being defined on its radially inner side by a thread area which is displaced radially inwardly of the normal thread diameter and on its outer side by a localized indentation surface which extends between an adjacent pair of said side walls, which is of a width substantially less than the width of said side walls, and which is disposed radially inwardly of a line including an adjacent one of said edges; a plurality of shear surfaces, each extending between one end of one of said localized indentation surfaces and the edge adjacent thereto; said bore having at least one thread convolution of substantially circular shape adjacent the end surface from which said indentations are spaced; and the portions of the outer periphery of said nut between said indentations retaining a configuration body whereby said nut body can be engaged by a standard wrench.

3. A lock nut comprising a nut body having two end surfaces; a central circular threaded bore extending from one end surface to the other end surface; six contiguous outer flat side walls of equal width converging along six axial edges extending parallel to the thread axis and spaced equally from the thread axis; two diametrically opposed indentations, each of which is disposed in a location generally centered with respect to a radial plane including a diametrically opposite pair of said edges, said indentations extending axially a distance less than one-half of the distance between said end surfaces and being spaced from one of said end surfaces, each of said indentations being defined on its radially inner side by a thread area which is displaced radially inwardly of the normal thread diameter and on its outer side by a localized indentation surface which extends between an adjacent pair of said side walls, which is of a width substantially less than the width of said side walls, and which is disposed radially inwardly of a line including an adjacent one of said edges; a plurality of shear surfaces, each extending between one end of one of said localized indentation surfaces and the edge adjacent thereto; said bore having at least one thread convolution of substantially circular shape adjacent the end surface from which said indentations are spaced; and the portions of the outer periphery of said nut between said indentations retaining a configuration body whereby said nut body can be engaged by a standard wrench.

4. A lock nut comprising a nut body having two end surfaces; a central circular threaded bore extending from one end surface to the other end surface; six contiguous outer flat side walls of equal width converging along six axial edges extending parallel to the thread axis and spaced equally from the thread axis; a plurality of symmetrically spaced indentations, each of which is disposed in a location generally centered with respect to a radial plane including one of said edges, and at one end of one of said edges, said indentations extending axially a distance less than one-half the distance between said end surfaces and being spaced from one of said end surfaces, each of said indentations being defined on its radially inner side by a thread area which is displaced radially inwardly of the normal thread diameter and on its outer side by a localized flat indentation surface which extends between an adjacent pair of said side walls, which is of a width substantially less than the width of said side walls and which is disposed radially inwardly of a line including an adjacent one of said edges; a plurality of shear surfaces of generally triangular shape, each extending between one end of one of said localized flat indentation surfaces and the edge adjacent thereto; said bore having at least one thread convolution of substantially circular shape adjacent the end surface from which said indentations are spaced and the portions of the outer periphery of said nut body between said indentations retaining a configuration whereby said nut body can be engaged by a standard wrench.

5. The method of manufacturing a lock nut which includes forming a nut body having two end surfaces, a central circular threaded bore extending from one end surface to the other end surface and an even number of contiguous outer flat side walls of equal width converging along axial edges extending parallel to the thread axis and spaced equally from the thread axis and striking said nut body with radially inwardly deforming forces by contacting a plurality of symmetrically spaced edges in locations spaced from one of said end surfaces with indenting members to displace the adjacent thread area radially inwardly of the normal thread diameter, each of said indenting members being effective to form an indentation surface on the outer periphery of said nut body which extends between an adjacent pair of said side walls, which is of a width less than the width of said side walls and which is generally centered with respect to a radial plane passing through the indented edge, the inward movement of said indenting members being operable to shear the material of said nut body at at least one end of each indentation surface, the indentation of said edges by said indenting member being effective to leave at least one thread convolution of substantially circular shape adjacent said one end surface and to leave the portions of the outer periphery of the nut body between said indentation surfaces with a shape whereby the nut body will accept a standard wrench.

6. The method of manufacturing a lock nut which includes forming a nut body having two end surfaces, a central circular threaded bore extending from one end surface to the other end surface and six contiguous outer flat side walls of equal width converging along six axial edges extending parallel to the thread axis and spaced equally from the thread axis and striking said nut body with radially inwardly deforming forces by contacting a diametrically opposite pair of said edges in locations spaced from one of said end surfaces with indenting members to displace the adjacent thread area radially inwardly of the normal thread diameter, each of said indenting members being effective to form an indentation surface on the outer periphery of said nut body which extends between an adjacent pair of said side walls, which is of a width less than the width of said side walls and which is generally centered with respect to a radial plane passing through the indented edge, the inward movement of said indenting members being operable to shear the material of said nut body at at least one end of each indentation surface, the indentation of said edges by said indenting member being effective to leave at least one thread convolution of substantially circular shape adjacent said one end surface and to leave the portions of the outer periphery of the nut body between said indentation surfaces with a shape whereby the nut body will accept a standard wrench.

References Cited by the Examiner

UNITED STATES PATENTS 2,464,729    3/49    Stover _____ 10—72

FOREIGN PATENTS 969,618    5/50    France.
1,228,099    3/60    France.

EDWARD C. ALLEN, *Primary Examiner.*

UNITED STATES PATENT OFFICE
Certificate of Correction

Patent No. 3,171,459                                                                    March 2, 1965

Harold A. Storch

It is hereby certified that error appears in the above numbered patent requiring correction and that the said Letters Patent should read as corrected below.

Figure 4:
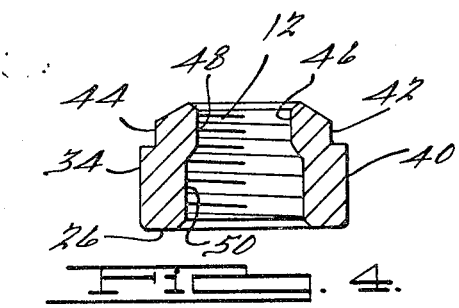
FIG. 4 is a sectional view of the structure illustrated in FIG. 3 taken along the line 4—4 thereof.
Figure 6:
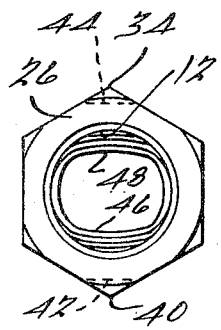
FIG. 6 is a bottom plan view of the structure illustrated in FIG. 3.

In the drawing, the present "FIG. 4" and "FIG. 6" should appear as shown below instead of as in the patent.

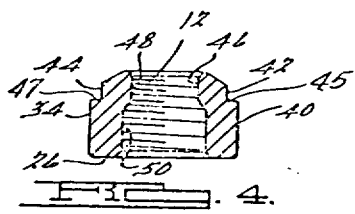 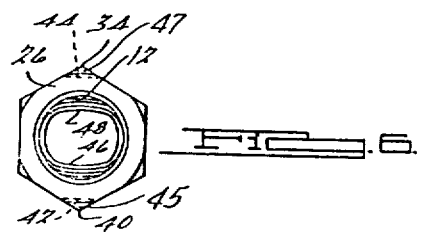

Signed and sealed this 27th day of July 1965.

[SEAL]

Attest:

ERNEST W. SWIDER                                            EDWARD J. BRENNER

*Attesting Officer*                                                       *Commissioner of Patents*